United States Patent [19]

Babcock

[11] Patent Number: 4,536,684
[45] Date of Patent: Aug. 20, 1985

[54] MULTIPLE SCAN RATE DEFLECTION CIRCUIT INCORPORATING SCAN COMPENSATION

[75] Inventor: William E. Babcock, Warren, N.J.
[73] Assignee: RCA Corporation, Princeton, N.J.
[21] Appl. No.: 497,953
[22] Filed: May 25, 1983
[51] Int. Cl.³ .............................................. H01J 29/70
[52] U.S. Cl. .................................... 315/411; 315/408
[58] Field of Search ................ 315/411, 408; 358/190; 363/21, 68

[56] References Cited

U.S. PATENT DOCUMENTS 3,784,872  1/1974  James ..................................... 315/27
4,302,708  11/1981 Spilsbury ............................. 315/389

OTHER PUBLICATIONS

Schematic Diagram of Conrac Video Monitor Scan Board, dated 3/17/81.
Conrac Technical Manual 7111/7211 RGB Color Monitor, May 1, 1982, pp. 3-11 to 3-16 and 3-35 to 3-47, Including Schematic Diagrams of Scan Board and High Voltage Regulator Board.

Primary Examiner—Theodore M. Blum
Attorney, Agent, or Firm—Paul J. Rasmussen; Joseph Laks; Scott J. Stevens

[57] ABSTRACT

A video display system operates at a plurality of horizontal scanning rates. A voltage source produces different voltage levels, one of which is selected in response to the horizontal rate selected. A horizontal deflection circuit produces retrace pulses having amplitudes dependent on the scanning rate. A high voltage transformer has a primary winding with a number of taps. The voltage source is connected to one of the taps in response to the horizontal deflection rate selected so that the high voltage level developed across the transformer secondary winding remains substantially constant independent of changes in retrace pulse amplitude.

3 Claims, 1 Drawing Figure

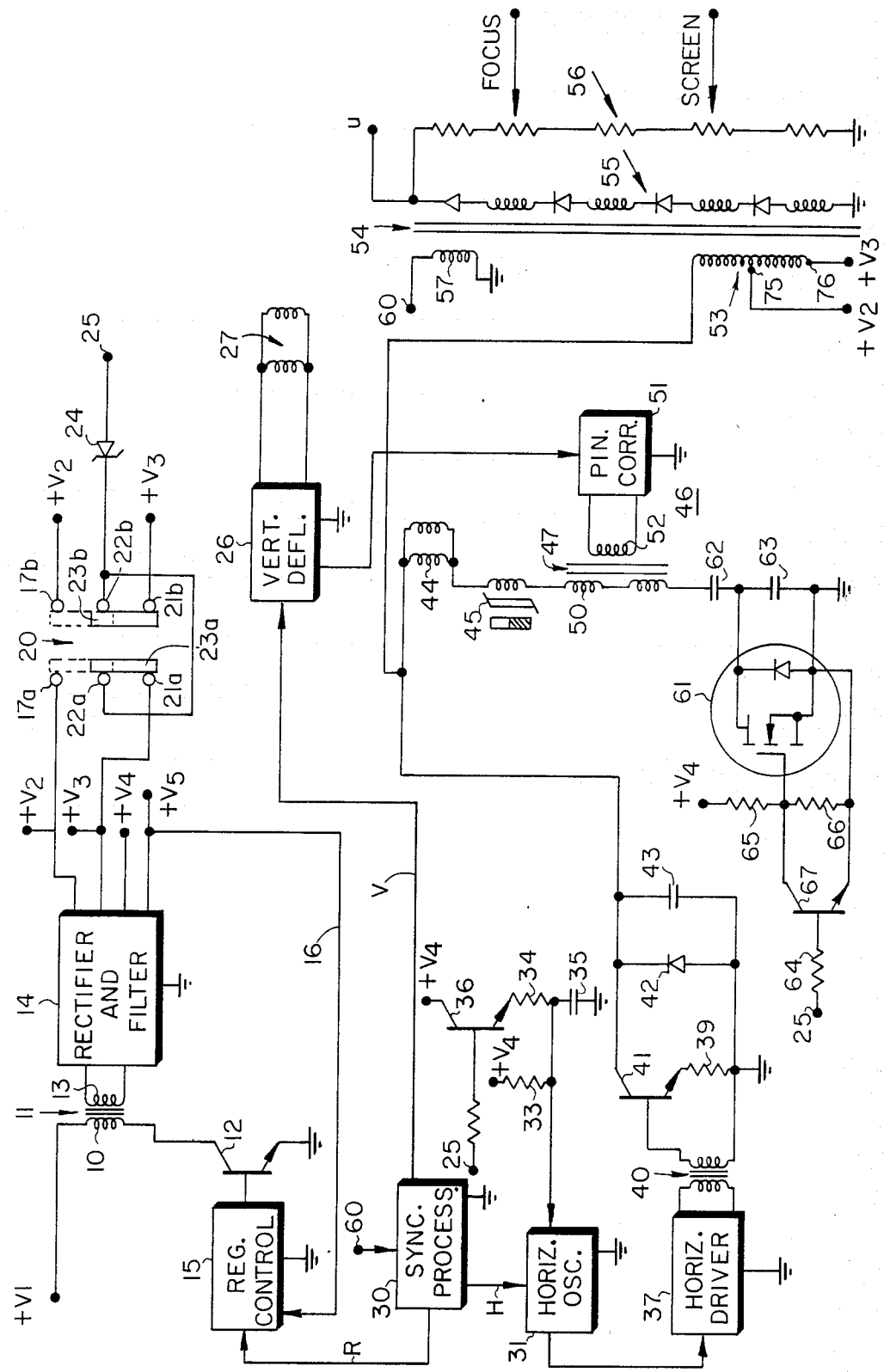

MULTIPLE SCAN RATE DEFLECTION CIRCUIT INCORPORATING SCAN COMPENSATION

This invention relates to power supply and deflection circuits for multiple scan rate video display systems and in particular to an arrangement for providing raster size compensation for different scanning or deflection rates.

The growing popularity of computers and word processing systems, particularly for home or small business use, requires some form of video information display. An ordinary television receiver is sufficient for some applications, but obtaining the desired readability in the reproduction of text and numbers often requires more resolution than a television receiver can provide. In particular, vertical resolution may be improved by increasing the number of horizontal raster lines flicker, line breakup and line crawl may be improved by providing a line by line or progressive scan, rather than an interlaced scan. Progressive scan systems often provide an increase in the horizontal scan rate. If the horizontal scanning rate is doubled, the vertical deflection rate may be left unchanged. This is particularly important in the personal computer market, where a dedicated monitor may not be economically feasible. It may be desirable to utilize a single unit as a combined receiver/monitor that is capable of providing high resolution for computer or word processing functions and normal video display for ordinary receiver operation. The capability of multiple horizontal scan rates may also be desirable in order to enhance the applicability of a video monitor with various software systems that specify particular scanning rates.

It is desirable to utilize as many of the same components as possible for multiple scan rate operation in order to reduce the cost and complexity of the circuitry. It is important, too, that the monitor performs to the same specifications with each horizontal scanning rate selected.

One problem which arises as a result of an attempt to use common circuit components is associated with the horizontal deflection circuit. If the same flyback transformer, yoke inductance, and horizontal retrace capacitor are utilized, the horizontal retrace or flyback pulse will be substantially the same in width for each scanning rate. A constant width retrace pulse will, however, cause the trace/retrace ratio to change for different horizontal scanning frequencies or rates, with the ratio increasing for decreasing scan rates. The trace/retrace ratio will increase, however, by a factor greater than the ratio of the scanning rates, so that the retrace pulse amplitude tends to be greater at the lower scanning frequency. Since the retrace pulse amplitude determines the high voltage level via the high voltage transformer, the high voltage level will increase as the horizontal scanning frequency or rate decreases.

In accordance with an aspect of the present invention, a power supply and deflection circuit for use in a video display system comprises horizontal deflection means adapted for operating at a plurality of selectable horizontal deflection or scanning rates. The deflection means incorporates circuitry which produces horizontal retrace pulses that have amplitudes that depend on the selected horizontal scanning rate. A voltage source produces different voltage levels and means select one of those voltage levels in response to the selected scanning rate. A transformer has a primary winding with a number of winding turns and a first terminal that is connected to the retrace pulse producing circuit. The transformer winding also has a number of taps which each form a primary winding with the first terminal and have different numbers of winding turns. A transformer secondary winding is magnetically coupled to the primary winding and produces a high voltage level in response to the amplitude of the horizontal retrace pulses on the primary winding. Means couple the voltage source to one of the taps in response to the selected scanning rate so that the high voltage level remains substantially constant independent of changes in retrace pulse amplitude.

In the accompanying drawing, the sole FIGURE is a schematic and block diagram of a power supply and deflection circuit in accordance with an aspect of the present invention.

Referring to the FIGURE, there is shown a portion of a circuit for a video monitor that operates at two horizontal deflection or scanning frequencies. A source of unregulated direct voltage $+V_1$, of the order of 300 volts dc, developed from an ac mains supply, is applied to a primary winding 10 of a power supply transformer 11. Primary winding 10 is also coupled to the collector of a switching transistor 12 so that conduction of transistor 12 causes current from the $+V_1$ voltage supply to flow in primary winding 10. The voltages induced in the secondary windings of transformer 11, of which one secondary winding 13 is illustratively shown, are rectified and filtered by appropriate circuits 14 to develop a plurality of direct voltages $+V_2$, $+V_3$, $+V_4$ and $+V_5$, which are used to power the circuits of the monitor. The voltage $+V_5$ is shown as being applied to a voltage regulator control circuit 15 via a conductor 16. Regulator control circuit 15 samples the level of the $+V_5$ voltage and controls the conduction duty cycle of transistor 12 by width modulating the gate drive signal for transistor 12. By controlling the conduction of transistor 12 on the basis of the voltage level of the feedback voltage $+V_5$, the level of the direct voltages $-V_2$, $+V_3$, $+V_4$ and $+V_5$ can be accurately regulated. The feedback or sample voltage for regulator control circuit 15 may be taken from a separate supply, as shown, or may be taken from one of the other voltage supplies instead.

The $+V_2$ voltage source is connected to a terminal 17a of one pole of a double pole switch 20. A corresponding terminal 17b is located on the other pole of switch 20. The $+V_3$ voltage source is connected to a terminal 21a of one pole of switch 20, which has a corresponding terminal 21b on its other pole. Common terminals 22a and 22b are located between terminals 17a,b and 21a,b respectively. Common terminal 22a is electrically connected to common terminal 22b. Switch contacts 23a and 23b electrically connect terminals 17a,b and 22a,b in a first position, and electrically connect terminals 21a,b and 22a,b in a second position. As a result, when switch 20 is in its first position, the $V_2$ voltage level, illustratively of the order of 90 volts dc, will appear at terminals 17b and 22b, and terminal 21b will be disconnected. When switch 20 is in its second position, as shown in the FIGURE, the $+V_3$ voltage level, illustratively of the order of 45 volts, will appear at terminals 22b and 21b, and terminal 17b will be disconnected.

Switch contact 20 is used to select the desired horizontal scanning frequency, illustratively 31.5 kHz in its first position or 15.75 kHz in its second position. In a manner that will be explained in detail later, switch 20 cooperates with other monitor circuitry to automatically perform each of the necessary parameter changes to provide the desired operation with either scanning frequency.

The voltage that appears at common terminal 22b (+$V_2$ or +$V_3$) is applied to the cathode of a zener diode 24. Zener diode 24 is chosen to avalanche at a voltage level above the level of voltage +$V_3$ and below the level of voltage +$V_2$. When switch 20 is in its first position, presence of voltage +$V_2$ at terminal 22b will cause zener diode 24 to avalanche or break down, resulting in a "high" signal level at terminal 25. When switch 20 is in its second position, voltage +$V_3$ at terminal 22b is insufficient to cause zener diode 24 to break down, and consequently a "low" signal level will appear at terminal 25.

The monitor includes a vertical deflection circuit 26 which provides vertical deflection current to vertical deflection windings 27 of a deflection yoke. The timing or synchronization of vertical deflection circuit 26 is provided by a vertical synchronizing signal via a conductor V from sync processing circuitry 30. Sync processing circuitry 30 provides a signal to regulator control circuit 15 via a conductor R which controls the timing of control circuit 15 in order to synchronize the conduction of transistor 12. Sync processing circuitry 30 also provides a horizontal synchronizing signal to a horizontal oscillator 31 of a horizontal deflection circuit via a conductor H.

The frequency of the output signal of oscillator 31 is determined in the following manner. The oscillator frequency is primarily determined by the value of an external network comprising resistors 33 and 34, capacitor 35, and transistor 36. With switch 20 in its second position (with a 15.75 kHz horizontal scanning frequency selected) the signal level at terminal 25 will be "low", so that transistor 36 is nonconductive. A resistive-capacitive network of resistor 33 and capacitor 35 has component values chosen to produce an oscillator frequency slightly less than 15.75 kHz. Oscillator 31 locks onto the desired horizontal rate by way of the synchronizing signal from sync processor 30. When switch 20 is in its first position (with a horizontal scanning rate of 31.5 kHz selected) the signal at terminal 25 will be "high", so that transistor 36 is turned on and becomes conductive. Resistor 34 will then become part of the RC network, providing an additional charge-discharge path for capacitor 35. The value of resistor 34 is chosen so that the time constant of the RC network (resistors 33 and 34 in parallel and capacitor 35) will cause the oscillator frequency to increase to slightly less than 31.5 kHz, so that oscillator 31 will lock on to the desired 31.5 kHz rate in response to the synchronizing signal on conductor H. The value of the capacitance of the RC network could, of course, be changed rather than the resistance.

The output of horizontal oscillator 31 is applied to a horizontal driver circuit 37 which, via a transformer 40, provides switching signals at the selected horizontal scanning rate to the base of a horizontal output transistor 41. Horizontal output transistor 41 comprises part of a horizontal output circuit that also includes a current limiting resistor 39, a damper diode 42, retrace capacitor 43 and horizontal deflection yoke windings 44. In series with yoke windings 44 is a magnetically biased saturable inductor 45 which provides raster linearity correction that compensates for energy losses during the latter part of each horizontal scan line. Side or east-west pincushion raster distortion is corrected by a pincushion correction device 46 incorporating a transformer 47 having a winding 50 in series with yoke windings 44. The horizontal deflection current flowing in transformer winding 50 is modified at the vertical rate by a signal generated by pincushion correction circuit 51 which receives an input from vertical deflection circuit 26. This correction signal is applied to a control winding 52 of transformer 47, which modulates the inductance of winding 50 and hence modifies the current flowing in winding 50.

The geometry of the kinescope or video display tube results in a nonlinear distortion of the scanned raster near the beginning and end of each horizontal scan line. In order to correct this nonlinearity, a capacitor is normally placed in series with the horizontal yoke windings. The capacitor charges during one portion of the horizontal scan interval and discharges during another portion, resulting in an S-shaping modification of the horizontal scanning current that produces the appearance of a linear scan.

The operating voltage of the horizontal output circuit is dependent upon the selected horizontal scan rate or frequency. In order to maintain the same peak to peak yoke current at 15.75 kHz and 31.5 kHz, the operating voltage of horizontal deflection output circuit at 31.5 kHz must be approximately twice the operating voltage at 15.75 kHz. This operating voltage is applied to the horizontal output circuit via a winding 53 of a high voltage transformer 54. As a result of the selected position of switch 20, either the +$V_2$ voltage or the +$V_3$ voltage will be applied to winding 53 and hence to the horizontal deflection output circuit.

The horizontal retrace pulses at the collector of horizontal output transistor 41 appear across winding 53 and, via transformer action, generate the desired high voltage level across the secondary winding 55. Secondary winding 55 comprises a plurality of winding segments separated by rectifying diodes. The high voltage or ultor potential for the kinescope or video display tube appears at an ultor terminal U. A resistor array 56 provides taps for focus and screen voltages used by the electron gun assembly in the kinescope or display tube. A separate winding 57 samples retrace pulses at the horizontal rate and generates a horizontal rate signal at a terminal 60 which is applied to sync processing circuit 30.

It is desirable to hold the high voltage level relatively constant whether the monitor is operated at 15.75 kHz or 31.5 kHz. If a common high voltage transformer and retrace capacitor are used for both 15.75 kHz abd 31.5 kHz operation, the retrace pulse width, and hence retrace time, will be the same at both frequencies. The change in the trace to retrace ratio at 15.75 kHz compared to 31.5 kHz will be greater than the change in circuit operating voltage, however, resulting in a higher amplitude retrace pulse at 15.75 kHz than at 31.5 kHz. This will cause the high voltage level, generated in response to the retrace pulse, to be greater at 15.75 kHz than at 31.5 kHz. In order to maintain the high voltage level constant at both scanning frequencies, the secondary/primary turns ratio is decreased (which tends to produce a slightly lower high voltage level) for 15.75 kHz operation. This is accomplished by providing multiple taps on the primary winding 53 of high voltage transformer 54 so that the number of primary winding turns is different for each of the appropriate operating voltage levels for the horizontal output circuit in response to the selected horizontal scanning rate. This can be seen in the FIGURE by the winding tap locations 75 and 76 for $+V_2$ and $+V_3$, respectively, which provides a greater number of primary winding turns during 15.75 kHz operation as compared to 31.5 kHz operation.

The amount of capacitance needed to provide the desired amount of S-shaping is less at 31.5 kHz than at 15.75 kHz since the correcting waveform resonant frequency determined by the yoke inductance and S-shaping capacitor must increase as the scanning frequency increases. An arrangement is shown in the FIGURE which provides the correct amount of S-shaping capacitance in response to the scanning frequency selection. This arrangement comprises an MOS field effect transistor 61, capacitors 62 and 63, resistors 64, 65 and 66, and transistor 67. The signal at terminal 25 is coupled to the base of transistor 67.

During operation at 15.75 kHz, the signal level at terminal 25 and hence at the gate of transistor 67, is low, therefore keeping transistor 67 nonconductive. This causes the collector of transistor 67 to be high, and by action of the voltage divider comprising resistors 65 and 66, causes conduction of transistor 61, thereby bypassing capacitor 63. Capacitor 63 is therefore selected to provide the correct amount of S-shaping correction to the deflection current at 15.75 kHz. During 31.5 kHz operation, the signal level at terminal 25 is high, transistor 67 is conducting, the collector of transistor 67 is low, bringing the gate of MOS transistor 61 low, and turning transistor 61 off. The effective S-shaping capacitor is therefore capacitors 62 and 63 in series. Capacitor 63 is selected so that its value in series with capacitor 62 provides the correct amount of S-shaping correction for the horizontal deflection current at 31.5 kHz. Capacitors 62 and 63 may also be coupled in parallel with an appropriate switching circuit. The correct amount of S-shaping and, as previously described, the horizontal oscillator frequency, are therefore determined in response to the level of the deflection circuit operating voltage.

The previously described video monitor provides the proper horizontal output circuit operating voltage, the desired horizontal oscillator frequency and the correct amount of S-shaping nonlinearity correction for each of the selected horizontal scan rates, as described in a copending application Ser. No. 447, 950 filed Nov. 25, 1983 in the names of W. F. Wedam et al., and entitled, "Power Supply and Deflection Circuit Providing Multiple Scan Rates". Although the circuits have been described with respect to two horizontal scan rates, any number of different scan rates could be provided with the described circuitry operating in a similar manner.

What is claimed is:

1. A power supply and deflection circuit for use in a video display system comprising:
   means for selecting one of a plurality of horizontal deflection rates;
   horizontal deflection means coupled to said selecting means for operating at said selected horizontal deflection rate, incorporating means for producing horizontal retrace pulses having amplitudes dependent upon said selected horizontal deflection rate;
   a voltage source providing a plurality of predetermined different voltage levels;
   means for selecting one of said voltage levels in response to said selected horizontal deflection rate;
   transformer means comprising:
   a transformer winding comprising a plurality of winding turns having a first terminal coupled to said means for producing horizontal retrace pulses, and having a plurality of taps, each of said taps forming, with said first terminal, a transformer primary winding having a different number of winding turns dependent on the tap selected; and
   a transformer secondary winding magnetically coupled to said primary winding for producing a secondary winding voltage in response to said retrace pulses on said primary winding; and
   means for applying said selected voltage level to one of said taps in response to said selected horizontal deflection rate, said tap selected such that said secondary winding voltage remains substantially constant during retrace in response to retrace pulses of different amplitudes.

2. The arrangement defined in claim 1, wherein the number of winding turns of said primary winding is increased as said horizontal deflection rate is decreased.

3. The arrangement defined in claim 1, wherein said secondary winding produces a high voltage level in response to said retrace pulses on said primary winding.

* * * * *

UNITED STATES PATENT AND TRADEMARK OFFICE
CERTIFICATE OF CORRECTION

PATENT NO. : 4,536,684
DATED : August 20, 1985
INVENTOR(S) : William Elden Babcock It is certified that error appears in the above-identified patent and that said Letters Patent is hereby corrected as shown below:

Column 2, line 39, that portion reading "$-V_2$," should read -- $+V_2$, --.

Column 2, line 57, that portion reading "$V_2$" should read -- $+V_2$ --.

Signed and Sealed this

Twenty-fifth Day of March 1986

[SEAL]

*Attest:*

*Attesting Officer*

DONALD J. QUIGG

Commissioner of Patents and Trademarks